United States Patent [19]

Edelman et al.

[11] 3,970,862
[45] July 20, 1976

[54] POLYMERIC SENSOR OF VIBRATION AND DYNAMIC PRESSURE

[75] Inventors: Seymour Edelman, Silver Spring, Md.; Steven C. Roth, Fairfax, Va.; John F. Mayo-Wells, Mount Airy, Md.

[73] Assignee: The United States of America as represented by the Secretary of the Navy, Washington, D.C.

[22] Filed: June 25, 1974

[21] Appl. No.: 477,141

[52] U.S. Cl. ............................ 307/88 ET; 29/25.35; 29/592
[51] Int. Cl.[2] ........................ G11C 13/02; H01S 4/00
[58] Field of Search ............ 307/88 ET; 179/111 E; 29/25.35, 592

[56] References Cited
UNITED STATES PATENTS

| | | |
|---|---|---|
| 3,736,436 | 5/1973 | Crites ............................ 307/88 ET |
| 3,772,133 | 11/1973 | Schmitt ........................ 307/88 ET |
| 3,794,986 | 2/1974 | Murayama .................... 307/88 ET |
| 3,821,491 | 6/1974 | Whetstone et al. ............ 307/88 ET |
| 3,821,492 | 6/1974 | Tamura et al. ................. 179/111 E |
| 3,894,198 | 7/1975 | Muroyama et al. ............ 179/111 E |
| 3,894,243 | 7/1975 | Edelman et al. ............... 307/88 ET |

*Primary Examiner*—James W. Moffitt
*Attorney, Agent, or Firm*—R. Sciascia; R. Beers; S. Sheinbein

[57] ABSTRACT

A transducer, and method for making it, comprising a composite film for sensing pressure comprising a pair of film sandwiches, each sandwich comprising a poled polymeric films with metallic film electrodes on opposite surfaces. One electrode does not extend quite to the end of the polymer and is considered the "hot" electrode. Two such transducer film sandwiches are cemented together with the hot electrodes in contact with each other, the center wire from a coaxial cable being in contact with and between them. The outer electrodes are electrically connected to the shield of the cable and the connection is encapsulated.

7 Claims, 5 Drawing Figures

POLYMERIC SENSOR OF VIBRATION AND DYNAMIC PRESSURE

BACKGROUND OF THE INVENTION

This invention comprises a vibration and pressure transducer and a method for making it, and especially a pressure transducer, and method for making it, in the form of a film, utilizing a poled polymeric film as a sensing element.

Transducers for sensing pressure waves are generally of the piezoelectric ceramic type. The size of these transducers is sometimes a handicap; either smaller or larger devices may be desired. Furthermore, these devices may be relatively expensive. It would be very desirable to have a pressure transducer which may be made in any shape or size that is useful for a particular application and which is very inexpensive to manufacture.

This type of transducer, or sensor, may be made from materials whose molecules are dipoles which can be treated to have a permanent net orientation. Such materials may be polymers and will be known as permanently polarizable polymers. By aligning many of the dipoles which, in the untreated state, are randomly oriented, the surfaces of a polymer film can be oppositely and permanently charged, i.e., the film has a permanent dipole moment. Pressure on the film disorients these aligned dipoles and produces changes in the surface charge detectable as voltage changes.

SUMMARY OF THE INVENTION

The invention comprises a dynamic pressure and vibration transducer consisting of a sandwich of two thin sheets of flexible, poled, polymeric film with metallic films comprising electrodes on each surface of the polymeric films. The high-potential electrode is at the interface between the sheets. Electrical lead connections are made to the high-potential electrode before the sheets are cemented together and to the outer, or ground, electrodes. The result is a transducer in the form of a flexible film which can be shaped as desired.

An object of this invention is to provide a transducer in the form of a flexible film which can be shaped and sized as desired.

Another object is to provide a pressure and vibration transducer which is inexpensive to make.

A further object is to provide a poled polymer transducer which comprises a flexible, thin sheet.

Yet another object is to provide a method for making such a polymeric, flexible-film transducer.

Other objects, advantages, and novel features of the present invention will become apparent from the following detailed description of the invention when considered in conjunction with the accompanying drawings.

DETAILED DESCRIPTION OF THE INVENTION

A sensor or transducer according to the present invention may be made in different shapes and may be large or small. One shape, which will be taken as an example, is round and perhaps one-half inch in diameter.

A sheet of polymeric material 10 such as polyvinyl chloride, polyvinylidene chloride, polyvinyl fluoride, polyvinylidene fluoride, or cellulose acetate butrate, for example, is treated by evaporating a metallic film through a mask to allow geometrically shaped areas of the metallic film, such as circles 12, to form on one of its surfaces. The metal may, for example, be aluminum. The other side of the polymer 10 is then coated with a metallic film such as nickel for example, to form a sandwich.

The polymer in the active areas (under the circles as shown in this embodiment) is now poled by applying a D.C. voltage across each of the metal circles 12 and the metallic film on the opposite surface. The field across the polymer should be between about 300,000 volts/cm to 1 million volts/cm, preferably 500,000 volts/cm. The polymer is heated to between 80° and 130°C., preferably 100°C., and then allowed to cool, the field being applied during heating and cooling. This permanently aligns many of the dipoles of the polymer in the same direction so that there is a net dipole orientation in that direction. The poling is done under enough pressure, preferably in a press, to keep the polymer from wrinkling as it is heated and cooled.

Figure 3:
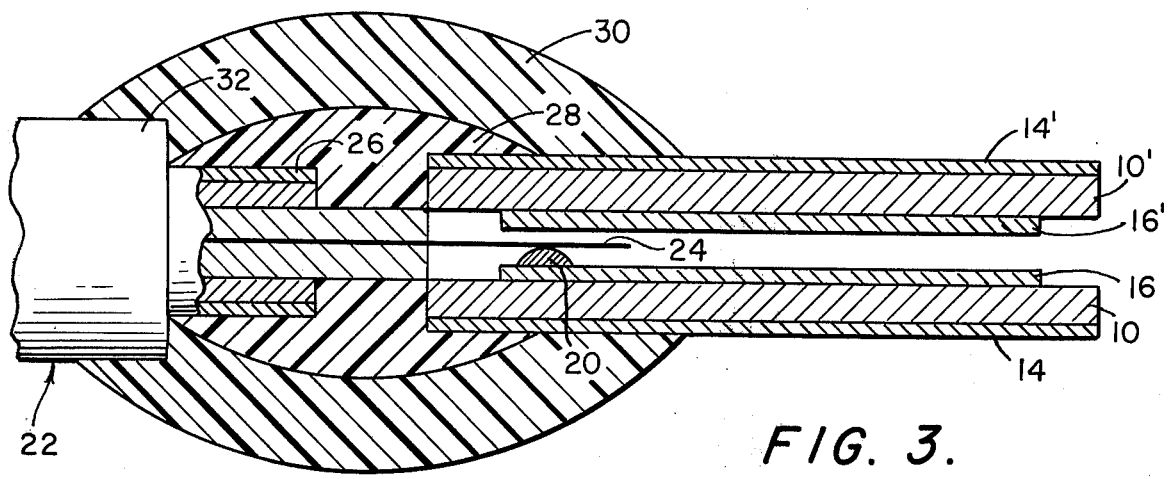
FIG. 3 is a side view in cross-section of a pressure transducer, showing how a coaxial cable is connected to the electrodes.
Figure 1:
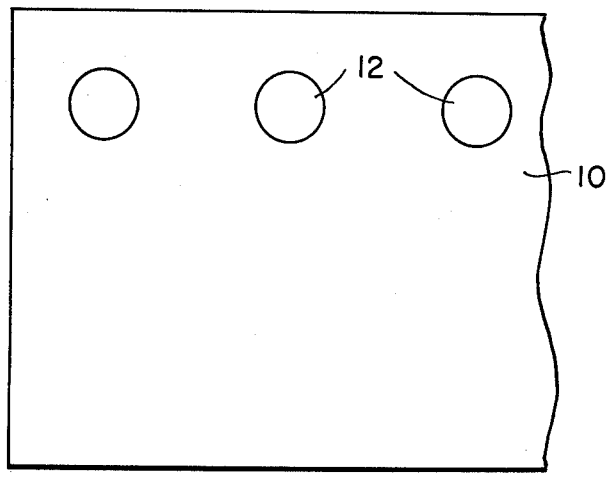
FIG. 1 is an illustration of a first stage in the manufacture of the invention.
Figure 4:
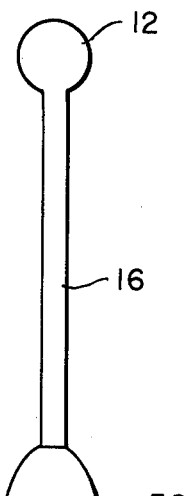
FIG. 4 is a plan view of the device shown in FIG. 3.
Figure 2:
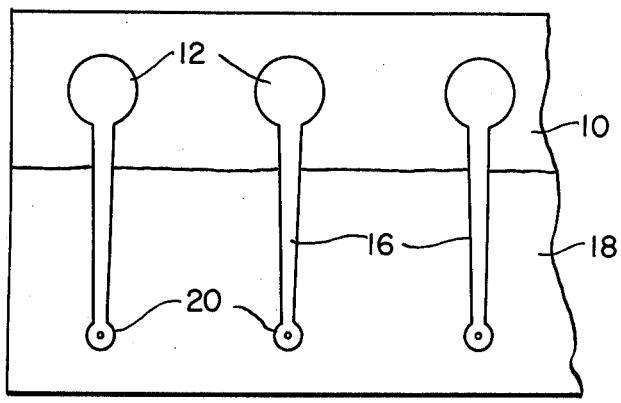
FIG. 2 is an illustration of a subsequent stage in the manufacture of the invention.

Another mask is now placed over the sheet 10 and metallic leads 16 of aluminum, for example, are laid down by evaporation (see FIG. 2). The capacitance of these leads may be as much or more than the capacitance of the active areas of the sensor if the active area is small. To reduce the capacitance of the leads when the particular application to which the sensor is put requires it, another layer 18 of polymer may be adhered to the surface of the first layer 10 before the leads 16 are laid down. Since the dielectric thickness is increased thereby, the capacitance is decreased.

A second sheet is now prepared with a mirror image of the first in every respect except for the silver-epoxy dots. The surfaces which have the metallic circles and leads are now coated with a very thin layer of contact cement and the cement is allowed to harden.

A small-sized coaxial cable 22 is a good means for connecting to the electrodes. The cable 22 is cut back first to expose the center wire 24 and then to expose the wire shield 26. The portion carrying the shield 26 is placed so that there is a gap between the shield 26 and the metallic film 14. The center wire is placed over the silver-epoxy dot 20 so that it extends somewhat beyond the dot. This is done for each lead 16. A dot 20 of conductive adhesive, such as silver-epoxy, is placed near the end of each lead 16 on one of the two film sandwiches and the bared center lead 24 of a small coaxial cable, for example, is laid on the dot 20 so as to extend somewhat past the dot. The second transducer sheet is now aligned exactly with the first so that the circles 12 and the leads 16 coincide with their corresponding circles and leads on the first sheet and the two sheets are pressed together firmly to form a composite film. No openings are left between the two sheets either in the polymeric-sheet areas in the front and rear or between the two metallic films 16 and 16'.

Each transducer on the composite film is now cut out of the composite sheet of which it is a part. The composite sheet is thin enough to be cut easily by a pair of scissors.

The outer electrodes 14 and 14' are now electrically connected to the coax cable shield 26. An easy way to do this is to place a glob 28 of silver-filled rubber or epoxy so that it encompasses the area between the shield and the transducer and also covers the exposed shield and a part of the outside electrodes 14 and 14'. After this hardens, it is preferable for strengthening the connection area to encapsulate this area by placing a glob 30 of epoxy over the previous glob 28 from the outside 32 of the cable 22 to a spot somewhat forward of the electrical-connection glob 28.

The thickness of the polymeric films that may be used varies from about ½ – 5 mils, although as much as 10 mils has been used. The difficulty with thinner films is that they tend to wrinkle under poling treatment.

The thickness of the aluminum lead and the circular electrode may be about 2,000 Angstroms. The thickness of the nickel electrode is about 300 Angstroms because it is desirable to be able to see through this layer for alignment purposes when the two transducer layers are cemented together. Other metals can also be employed to form the electrodes. It is obvious, of course, that the active area of the transducer can have any geometrical shape that is desired—circle, triangle, square, rectangle, polygon—and can be as small or as large as desired.

Film transducers made by this method may be used in many different applications for sensing vibrations and dynamic pressures, especially on thin or compliant surfaces. The transducers have very little mass and can be attached easily to various surfaces by a little cement or glue. They provide a wide frequency response and are very inexpensive, so much so as to be in the throwaway class. Typical applications are for maintenance of bearings and transmissions in vehicles, biomedical studies in humans and animals in whom they may be implanted and studies of flow noise and turbulence.

Figure 5:
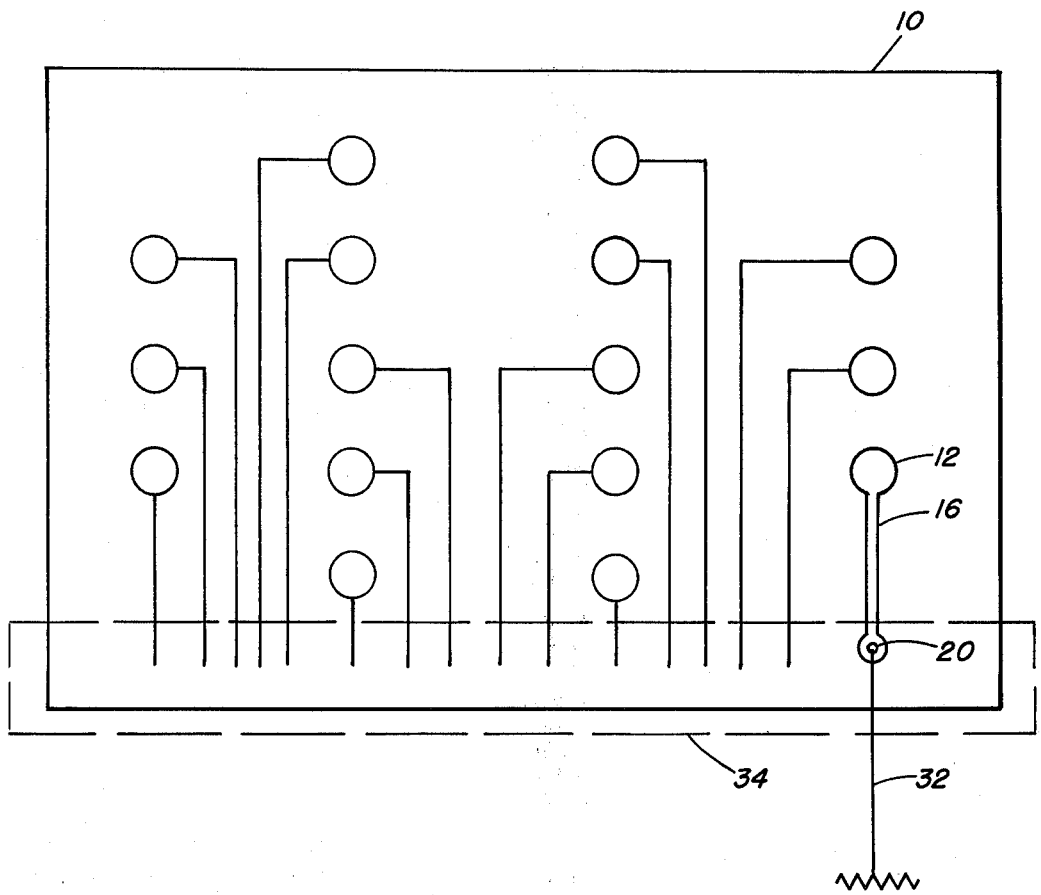
FIG. 5 is a schematic plan view of one of the sandwiches for forming an array of transducers.

It is, of course, obvious that instead of cutting out individual transducers, an array of transducers may be made in the same way as the single transducers are made. Such an array may, for example, look like the one shown in FIG. 5. The electrodes 12 are formed in a desired array pattern on the polymeric sheet 10. After poling the active areas under these electrodes, the electrode leads 16 are formed (only one is shown accurately—the others are shown schematically as single line). A dot 20 of conductive adhesive is placed near the end of the lead 16 and an external lead 32 is placed on the dot 20. The other sandwich, which is made with a mask which is a mirror-image of the first, is placed over the one shown so that the circles and their leads are in alignment and the two are cemented together. If the array and leads are symmetrical about an axis drawn vertically through the middle of the array, the same mask can be used for both sandwiches. Epoxy resin is then coated over the bottom of the composite transducer array in the connection and lead-in area as indicated approximately by the dashed area 34.

Obviously, many modifications and variations of the present invention are possible in light of the above teachings. It is therefore to be understood that, within the scope of the appended claims, the invention may be practiced otherwise than as specifically described.

What is claimed is:

1. A polymeric film transducer for sensing dynamic pressure and vibrations comprising:

a first film sandwich comprising a sheet of permanently polarizable polymeric film, one surface being coated with at least one geometrically shaped area of electrically conductive material forming a lead to said geometrically shaped area, the other surface of said polymeric sheet having an electrically conductive coating covering at least the same area as said geometrically shaped area;

a second film sandwich which is a mirror image of the first, said second sandwich being cemented over and in geometrical correspondence with the first, the surface carrying the geometrically shaped films and leads forming the contacting interface, wherein the inactive lead area is in the form of a narrow strip;

electrical connection means making electrical contact with said interfacing coatings in the lead area comprising the center wire of a coaxial cable fitting between the interfacing coatings; and electrical connection means making electrical contact with both of said outer conductive coatings in the lead area including the metallic shield of said cable and an electrically conductive, flexible, adhesive material extending from the shield to the outer coatings.

2. A transducer as in claim 1, wherein one of said interfacing coatings carries an electrically conductive adhesive dot thereon which is higher than the surrounding surface, the interface electrical connection means being in contact with this dot.

3. A transducer as in claim 1, wherein the electrically conductive coatings are metallic films.

4. A transducer as in claim 1, wherein the interfacing conductive coatings are formed from aluminum and the outer coatings are formed from nickel which is thin enough to be transparent.

5. A transducer as in claim 1, further including means for encapsulating the area of connection covered by said electrically conductive, flexible, adhesive material.

6. A transducer as in claim 5, wherein said electrically conductive, flexible, adhesive material is silver-filled epoxy.

7. A transducer as in claim 5, wherein said encapsulating material is epoxy resin.

* * * * *